United States Patent [19]

Hutchens

[11] 4,077,736
[45] Mar. 7, 1978

[54] DRILL SPEEDER FOR MACHINE TOOLS

[75] Inventor: Morris L. Hutchens, Brookfield, Wis.

[73] Assignee: Kearney & Trecker Corporation, West Allis, Wis.

[21] Appl. No.: 783,682

[22] Filed: Apr. 1, 1977

[51] Int. Cl.² .................. B23B 47/06; B23B 49/00
[52] U.S. Cl. ................................. 408/16; 408/6;
        408/9; 408/124; 29/568; 51/134.5 R; 90/11 A;
        173/163; 279/1 A
[58] Field of Search ............... 408/16, 8, 9, 6, 124,
        408/125, 239 A; 51/134.5 R; 29/568; 173/163;
        90/11 A; 279/1 A, 1 TS

[56] References Cited

U.S. PATENT DOCUMENTS

| 2,357,109 | 8/1944 | Heath | 51/90 |
| 3,687,467 | 8/1972 | Kosmowski | 279/1 B |
| 3,752,595 | 8/1973 | Woythal et al. | 408/124 |
| 3,803,981 | 4/1974 | Allgeyer | 408/124 |

FOREIGN PATENT DOCUMENTS 588,802  6/1947  United Kingdom ................. 408/124

Primary Examiner—Leonidas Vlachos
Attorney, Agent, or Firm—Cyril M. Hajewski; Donald J. Piggott

[57] ABSTRACT

An electric motor driven drill and a battery therefor are mounted within a toolholder for a machine tool. The battery is coupled to the motor through a centrifugal switch which closes when the toolholder is rotated about its axis above a predetermined speed and opens when the rotary speed of the toolholder falls below the predetermined speed. The toolholder is mounted in the spindle of a machine tool and the drill turns on when the spindle is rotated and turns off when the spindle stops, the rotary speed of the spindle being added to the rotary speed of the drill in one direction of spindle rotation and subtracted from the rotary speed of the drill in the opposite direction of spindle rotation.

6 Claims, 2 Drawing Figures

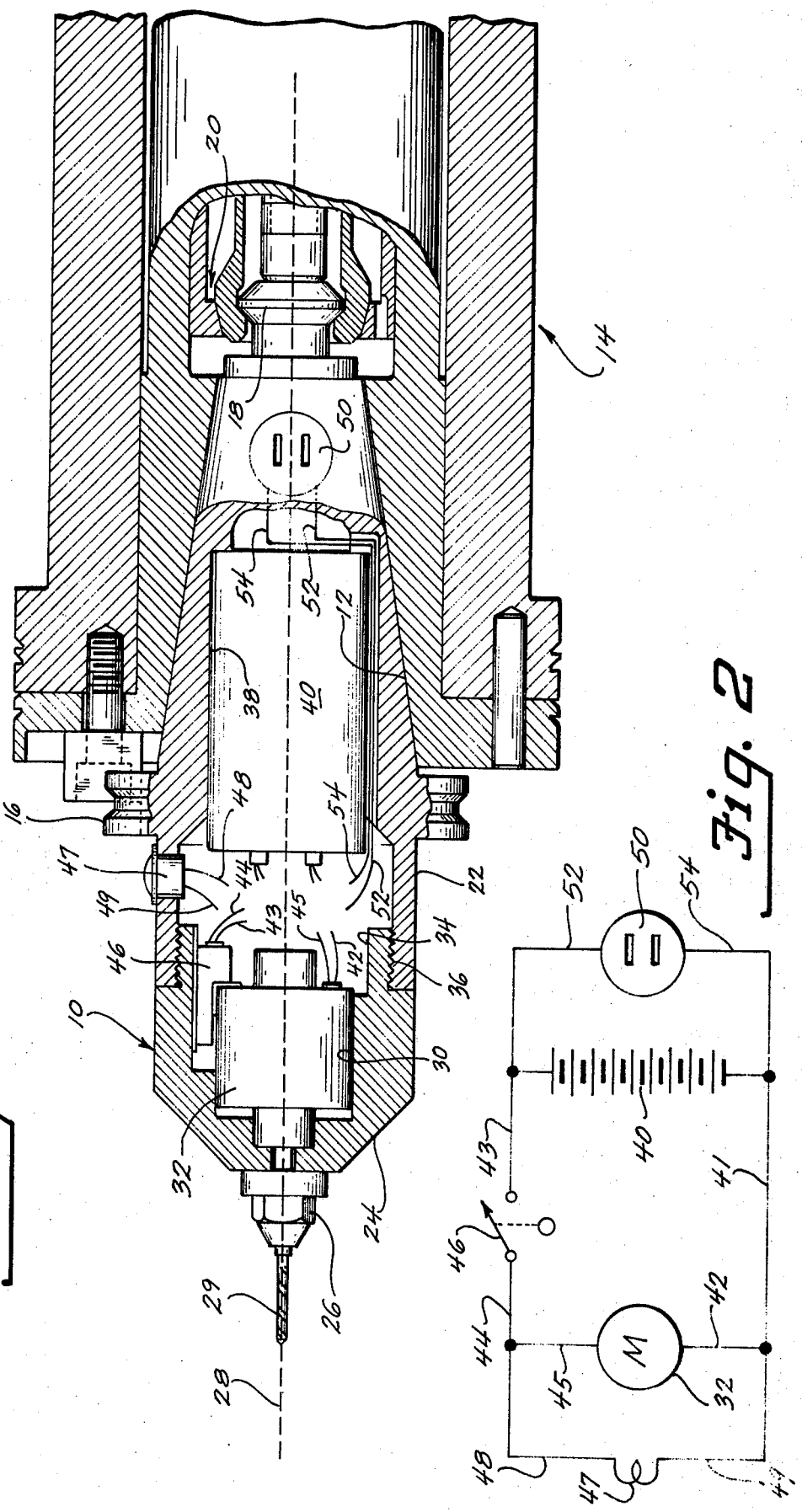

DRILL SPEEDER FOR MACHINE TOOLS

BACKGROUND OF THE INVENTION

This invention relates to drill speeders for machine tools. In a conventional machine tool for general purpose work, a recurring problem is to have sufficient spindle speed for small drills in the range of 0.005 inch to 0.090 inch diameter. This is especially true in a tool changing machine such as a machining center. Various techniques and attachments have been devised in the past for achieving the required high speeds but with limited success.

One prior art attachment for achieving a high drill speed is the conventional drill speeder in which the machine tool spindle rotation is multiplied by a gear train. The speeder gear train is mounted in a housing which is held stationary while the gear train is driven by the machine tool spindle. However, the requirement that the speeder housing be held stationary complicates the mounting of the speeder. Also, the conventional drill speeder requires a special adapter to be handled by an automatic tool changer. This special adapter is described in U.S. Pat. No. 3,752,595 which was issued on Aug. 14, 1973, for an "ADAPTER FOR DRILL SPEEDER".

Accordingly, the principal object of this invention is to provide a drill speeder whose housing does not have to be held stationary when it is driven by a machine tool spindle.

Another object of this invention is to provide a drill speeder which does not require a special adapter to be handled by an automatic tool changer.

Other objects and advantages of the invention will be apparent from the detailed description herein.

DESCRIPTION OF THE DRAWINGS

FIG. 1 is an axial sectional view of a preferred embodiment of the invention mounted in the spindle of a horizontal machining center; and FIG. 2 is a schematic circuit diagram of the electrical portions of the preferred embodiment.

DESCRIPTION OF THE PREFERRED EMBODIMENTS

Referring to FIG. 1, a preferred embodiment of the invention is shown mounted in a standard shape toolholder 10 which in turn is mounted in the toolholder socket 12 of a spindle 14. Spindle 14 is rotatably mounted by conventional means (not shown) in the spindle head (not shown) of a conventional horizontal machining center (not shown). However, spindle 14 could be vertical in other applications of the invention. Toolholder 10 has a grooved flange 16 in its central portion for handling by an automatic tool changer and has a retention knob 18 on its inner end which is clamped in place by a conventional collet type toolholder clamp 20. The area between flange 16 and retention knob 18 is in the shape of a truncated cone which matches toolholder socket 12.

Toolholder 10 is made of two parts: a rear portion 22 and a front portion 24 which are held together by screw threads or other means. Front portion 24 has a collet type drill chuck 26 rotatably mounted in the nose thereof coaxial with the axis 28 of toolholder 10. Drill chuck 26 is adapted to receive relatively small drills in the range of 0.005 inch to 0.090 inch in diameter. The drill 29 shown in chuck 26 is shown as being larger for the sake of clarity.

Front portion 24 has a recess 30 therein in which a d.c. motor 32 is mounted. Motor 32 is mechanically coupled to drill chuck 26 by conventional means to drive chuck 26. At its rearward end, front portion 24 has a recessed threaded collar 34 which screws into a threaded portion 36 in the front end of rear portion 22.

Rear portion 22 has a recess 38 therein in which a battery 40 is mounted. Battery 40 is coupled to motor 32 by conductors 41, 42, 43, 44 and 45 in a series circuit which includes a conventional centrifugal switch 46 which switches on when toolholder 10 is rotated about the axis 28 above a predetermined speed of of spindle 14 and switches off when the rotary speed of spindle 14 drops below the predetermined level. Centrifugal switch 46 is coupled in series between battery 40 and motor 32 and serves to turn motor 32 on automatically when spindle 14 is rotated at its standard speed and to turn motor 32 off automatically when spindle 14 stops rotating.

A pilot light 47 is mounted in the wall of rear portion 22 by conventional means and is connected in parallel with motor 32 by conductors 48 and 49 to indicate whether or not motor 32 is turned on.

A recharging receptacle 50 is also mounted in the wall of rear portion 22 and is connected to the terminals of battery 40 through conductors 52 and 54. Receptacle 50 fits flush with the surface of toolholder 10 and does not interfere with its mounting in toolholder socket 12 or with its being handled by an automatic toolholder. When it is desired to recharge battery 40, a plug having the required d.c. voltage applied thereto is plugged into receptacle 50 and is left there long enough to recharge battery 40.

It should be noted that the outer configuration of toolholder 10 is conventional and that toolholder 10 can be handled by an automatic tool changer without any adaptation. Also, the operation of the drill speeder is completely automatic. It automatically turns on as soon as spindle 14 begins to rotate above the predetermined speed which switches centrifugal switch 46 on and automatically turns off when the rotary speed of spindle 14 falls below the predetermined speed. In one direction of spindle rotation, the rotary speed of spindle 14 adds to the rotary speed of drill 29, and in the other direction of spindle rotation, the rotary speed of spindle 14 subtracts from the rotary speed of drill 29. Therefore, a relative speed range is available to handle different materials.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A drill speeder for a machine tool having a spindle, means on said spindle for receiving a toolholder and clamping said toolholder therein, and means for rotating the spindle about its axis, comprising:

a toolholder adapted to be clamped in said spindle and rotated thereby;

a drill chuck rotatably mounted on said toolholder coaxial with the axis thereof;

an electric motor mounted within said toolholder and coupled to said drill chuck to drive the drill chuck;

a battery mounted within said toolholder;

a switch mounted within said toolholder; and means coupling said battery, said motor, and said switch in series so that said motor is turned on when said switch closes and is turned off when said switch opens.

2. The drill speeder according to claim 1 wherein said switch is a centrifugal switch which is operable to close when said toolholder is rotated about its axis above a predetermined speed and to open when the rotary speed of said toolholder falls below a predetermined speed.

3. The drill speeder according to claim 1 and further comprising a recharging receptacle mounted on said toolholder and connected across said battery for coupling a recharging voltage thereto.

4. The drill speeder according to claim 1 and further comprising:

a pilot light mounted in said toolholder and connected in parallel with said motor to be lit when said motor is energized and to be turned off when said motor is de-energized.

5. The drill speeder according to claim 1 wherein said toolholder is divided into a front portion and a rear portion which are connected together by screw threads.

6. The drill speeder according to claim 5 wherein said front portion has a recess therein and said motor is mounted within said recess and wherein said rear portion has a recess therein and said battery is mounted within the recess in said rear portion.

* * * * *